Sept. 14, 1948.    E. A. DORMAN    2,449,284
MACHINE TOOL ADAPTER
Filed March 29, 1946
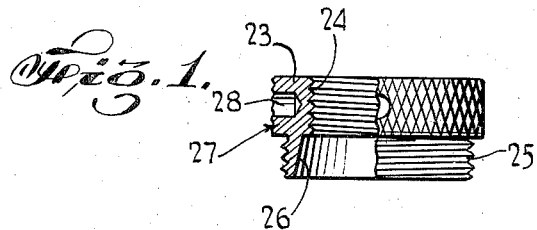
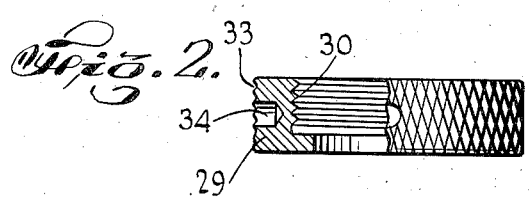
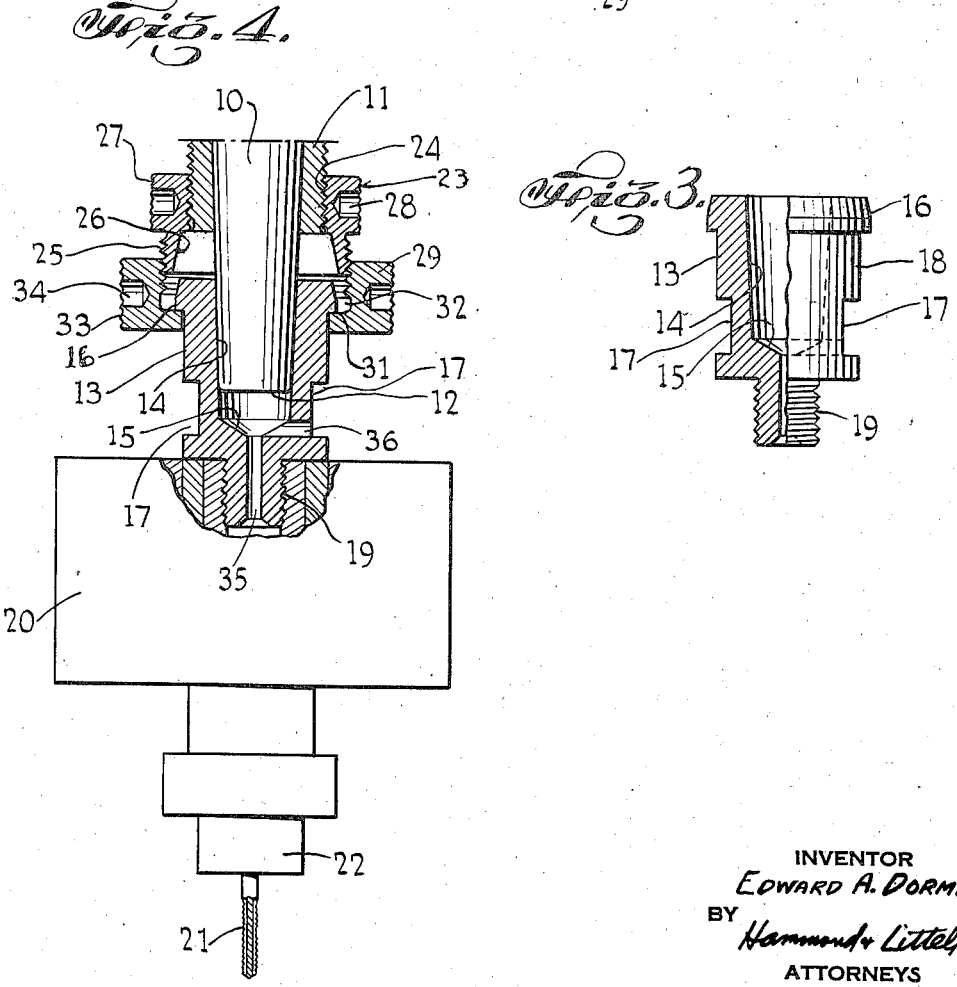
INVENTOR
Edward A. Dorman
BY
Hammond & Littell
ATTORNEYS Patented Sept. 14, 1948

2,449,284

UNITED STATES PATENT OFFICE 2,449,284

MACHINE TOOL ADAPTER

Edward A. Dorman, New Rochelle, N. Y.

Application March 29, 1946, Serial No. 658,246

3 Claims. (Cl. 279—1)

This invention relates to an adapter for holding various types of tools on a spindle and is particularly useful in conjunction with a drill press.

The conventional drill press, either of the single or multiple spindle type, usually has reciprocable spindles with tapered ends thereon for carrying drill chucks, said chucks having tapered apertures fitting said spindles. The spindle usually has a threaded sleeve or threaded portion adjacent the tapered end thereof upon which may be mounted a nut, said nut being rotatable so as to move toward the drill chuck and force the drill chuck from the tapered spindle.

Frequently it is desirable to mount other types of tools or chucks on said spindle and this requires special adapters which can be placed and removed easily therefrom. The adapters must be so constructed that they will be firmly held upon the spindle and do not turn relative thereto during rotation of a tool by the spindle.

One of the objects of the invention is to provide an assembly for a drill spindle which can be mounted and removed with ease, said adapter having means thereon for fastening other tool carrying devices thereto. This can be accomplished by providing a connector nut for adjustable mounting on the spindle and a coupling nut for adjustably joining the connector and the adapter, the adapter having a means thereon to which a tool carrying device can be fastened.

These and other objects of the invention will become apparent from the following description and drawings.

In the drawings:

Fig. 1 is a view partially in section of the connector.

Fig. 2 is a view partially in section of the coupling nut.

Fig. 3 is an elevation partially in section of the adapter element.

Fig. 4 is an assembled view partially in section of the adapter with one form of tool mounted thereon.

In a preferred embodiment of the invention, 10 shows the end of a tapered drill spindle having a threaded portion 11 thereon adjacent the end 12 of the drill spindle. The threaded portion 11 may be integral with the drill spindle or may be in the form of a sleeve placed thereon in some suitable manner. Adapter 13 has a tapered aperture 14 therein of substantially the same taper or a taper complementary to the drill spindle 10, the size being so chosen that the end 12 of the drill spindle does not come to the bottom of aperture 14. The adapter 13 has a shoulder 16, the shape of the shoulder being made suitable for the purpose of being engageable by the coupling nut as described hereafter.

Flat areas 17 may be provided on the shank 18 of the adapter for receiving the end of a wrench and holding the adapter as a tool carrier is assembled thereto or as the various nuts are adjusted in mounting the adapter. Projection 19 may be screw threaded for the purpose of receiving the tool carrying element which is to be attached to the adapter although, of course, other suitable means may be provided.

As an example of one type of tool carrier, Fig. 4 shows a tap carrier 20 screwed onto stud 19, a tap 21 being held in the chuck 22 of the carrier 20.

Connector nut 23 has an interiorly threaded bore 24 and an exteriorly threaded portion 25. The diameter of the enlarged bore 26 of the connector nut 23 preferably is larger than the outside diameter of the shoulder 16 so that the shoulder 16 will pass up within said bore, the diameter of the bore being made larger than said outside diameter of shoulder 16 so as to allow considerable longitudinal adjustment of the connector relative to the adapter 13, the shoulder being enterable into the enlarged bore as the connector 23 is tightened relative to coupling nut 29. The bore 26 and upper part of shoulder 16 may be tapered as shown to assist in centering the parts relative to each other. Nut 23 may have suitable knurling 27 on the exterior thereof and sockets 28 for receiving suitable wrenches.

Coupling nut 29 has an interiorly threaded bore 30 which is screw-threadedly engageable with the exteriorly threaded portion 25 of connector nut 23. A ledge 31 is formed at the bottom of bore 32 of the coupling nut, said ledge being engageable with shoulder 16 of the adapter and operable to support the same as coupling nut 29 is turned relative to nut 23. Coupling nut 29 may have a knurled surface 33 and may have apertures 34 for receiving suitable wrenches. The bottom 15 of the tapered aperture in the adapter may have oil relief holes 35 and 36 formed therein.

When it is desired to assemble the adapter on the spindle, the adapter 13 may be inserted into coupling nut 29. Nut 23 then may be screw-threadedly engaged with the exteriorly threaded portion 25 of the connector. It is also apparent that the connector and coupling nut first may be assembled with the adapter before the unit is assembled on the drill spindle. It also is apparent that the nuts 23 and 29 may be adjusted relative to each other as well as the connector nut 23 longitudinally being adjustable on the spindle. After the assembly has been placed on the spindle and the tapered drill spindle 10 engaged with the tapered aperture 14, tightening of the nuts 23 and 29 relative to each other will cause firm engagement of the adapter 13 on the drill spindle so that the adapter cannot rotatably slip thereon when a tool carried thereby is operated. The tool carrier 20 then may be mounted on threads 19.

It is apparent that various modifications may be made in the structure shown and equivalent devices used without departing from the spirit of the invention or the scope of the appended claims.

What is claimed:

1. A device for mounting a tool on a tapered drill spindle or the like comprising, an adapter having means to mount a tool thereon, said adapter having an interiorly tapered aperture for interengagement with the tapered end of the drill spindle; a connector mountable on said spindle and axially adjustable thereon; and a coupling element adjustably engageable with said connector and movable axially thereof, said coupling element having a portion thereof engageable with said adapter so that upon tightening of said coupling element on said connector the adapter will be adjustably positioned axially on said drill spindle, whereby said adapter can be removably and adjustably held on a drill spindle so as to hold a tool thereon.

2. A tool holder for a drill press having a drill spindle with a tapered end and a threaded exterior portion adjacent said end; an adapter having means thereon to mount a tool, said adapter having a tapered aperture engageable with said tapered drill spindle end and having a shoulder thereon; a connector having a threaded bore axially adjustably engageable with said threaded spindle exterior and having an exteriorly threaded portion; and a coupling nut having an interior bore and means in said bore engageable with said shoulder when said nut is assembled with said adapter, the interior of said coupling nut bore having a threaded portion engageable with said exteriorly threaded portion of the connector, whereby said connector can be adjusted axially on said spindle and said coupling nut tightened on said connector to adjustably position said adapter on said tapered drill spindle end.

3. A drill spindle adapter for holding various tools on a tapered drill spindle having a threaded portion adjacent the end of said drill spindle comprising, an adapter having means to connect a tool therewith, said adapter having a tapered aperture for interengagement with said tapered drill spindle end and having an exterior transversely extending shoulder thereon; a connector having an interiorly threaded portion engageable with said threaded portion on said spindle and adjustable axially relative to said spindle, said connector having an exteriorly threaded portion and an enlarged bore at the end opposite to said interiorly threaded portion, said bore being coextensive axially with at least a portion of said exteriorly threaded portion of the connector, said bore being adapted to receive said shoulder; and a coupling nut engageable with said adapter shoulder when the coupling nut is assembled with said adapter, said coupling nut having threads engageable with said exteriorly threaded portion of the connector, said coupling nut being tightenable on said connector to draw said adapter onto said spindle end and position the adapter axially relative to the spindle.

EDWARD A. DORMAN.

REFERENCES CITED

The following references are of record in the file of this patent:

UNITED STATES PATENTS

| Number | Name | Date |
|---|---|---|
| 1,104,044 | Goetz | July 21, 1914 |
| 1,657,987 | Albertoni | Jan. 31, 1928 |
| 1,730,482 | Slyder | Oct. 8, 1929 |
| 1,774,050 | Braun | Aug. 26, 1930 |
| 2,258,377 | Collins | Oct. 7, 1941 |

FOREIGN PATENTS

| Number | Country | Date |
|---|---|---|
| 1,305 | Great Britain | Jan. 17, 1914 |
| 14,550 | Great Britain | July 1, 1896 |
| 156,088 | Great Britain | Mar. 6, 1922 |